United States Patent [19]
Nakayama et al.

[11] Patent Number: 5,400,318
[45] Date of Patent: Mar. 21, 1995

[54] EDGE DETECTION OF INFORMATION PIT PATTERN BY ESTABLISHING THRESHOLD VOLTAGE FROM A CLOSELY SPACED PIT PATTERN

[75] Inventors: Hiroshi Nakayama; Masaki Kagawa, both of Miyagi; Yoshimori Yamasaki, Kanagawa, all of Japan

[73] Assignee: Sony Corporation, Tokyo, Japan

[21] Appl. No.: 79,555

[22] Filed: Jun. 22, 1993

[30] Foreign Application Priority Data

Jun. 23, 1992 [JP] Japan ................................ 4-165065

[51] Int. Cl.$^6$ ............................................. G11B 7/26
[52] U.S. Cl. .................... 369/275.3; 369/59; 369/124
[58] Field of Search ............ 369/275.3, 106, 116, 369/120, 124, 13, 54, 59

[56] References Cited

U.S. PATENT DOCUMENTS 4,743,774  5/1988  Maeda et al. .................... 369/124
4,866,692  9/1989  Saito et al. ...................... 369/59
4,961,182 10/1990  Saito et al. ..................... 369/124
5,218,591  6/1993  Shimamoto et al. ............. 369/54
5,233,589  8/1993  Saito et al. ..................... 369/124

FOREIGN PATENT DOCUMENTS 0283017  9/1988  European Pat. Off. .

OTHER PUBLICATIONS

Patent Abstracts of Japan, Jun. 18, 1988, "Recording-/Reproducing System", Saito Atsuhi, vol. 12, No. 408.

*Primary Examiner*—Paul M. Dzierzynski
*Assistant Examiner*—Kim-Kwok Chu
*Attorney, Agent, or Firm*—Hill, Steadman & Simpson

[57] ABSTRACT

In an edge detection method, a tightest data portion for forming a tightest pit pattern therein is provided in an area in the front of an effective data portion where an information pit pattern is formed, and the threshold voltage is established on the basis of the tightest pit pattern formed in the tightest data portion.

8 Claims, 6 Drawing Sheets

EDGE DETECTION OF INFORMATION PIT PATTERN BY ESTABLISHING THRESHOLD VOLTAGE FROM A CLOSELY SPACED PIT PATTERN

BACKGROUND OF THE INVENTION

1. Field of the Invention

The present invention relates to a method for detecting a signal recorded on an optical recording medium, in which an edge detection method is used to reproduce digital data from an information pit pattern.

2. Description of the Related Art

Figure 9:
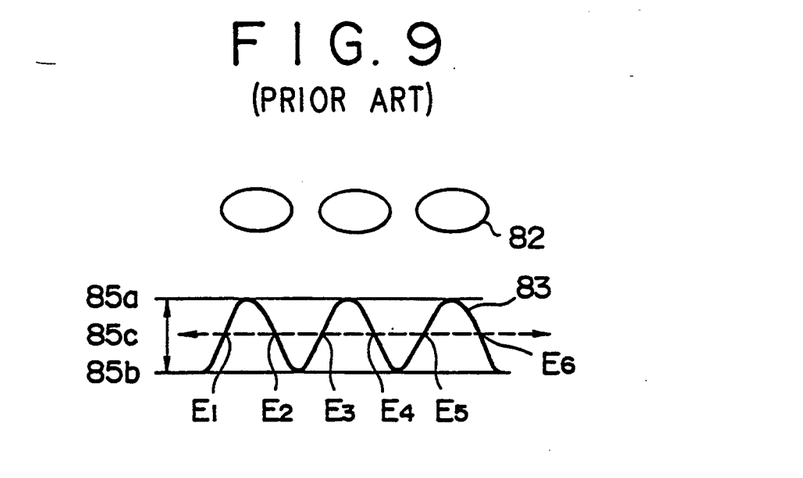
FIG. 9 is a schematic diagram explanatory of an edge detection method.

In order to reproduce digital data from a pit pattern formed on an optical recording medium by mark-length recording, an analog signal is reproduced from the pit pattern 82 as shown in FIG. 9 and the analog signal is passed through a low-pass filter to be deprived of the DC component and a reproduced waveform 83 is generated. Then, inverted positions of data are discriminated from the reproduced waveform 83 and, thereby, the digital data is demodulated.

As a method to discriminate inverted positions of data from a reproduced waveform 83, there is known an edge detection method in which an established threshold voltage is superposed on the reproduced waveform to detect positions (edge positions) where the reproduced waveform 83 intersect with the threshold voltage, and the edge positions thus detected are taken as the inverted positions of data. In the edge detection method, the digital data is reproduced according to the detected edge positions, for example by taking an edge-to-edge distance as data 1, taking the next edge-to-edge distance as data 0, and so on.

As the threshold voltage for detecting the edge positions, the average value of the minimum voltage $85b$ and the maximum voltage $85a$, $[(85a+85b)/2]$, of the reproduced waveform 83 denoted by $85c$ in FIG. 9 is normally used. When such a threshold voltage is used, six edge positions $E_1$, $E_2$, $E_3$, $E_4$, $E_5$, and $E_6$ are detected as shown in FIG. 9.

When the average value of the minimum voltage and the maximum voltage of the reproduced waveform is established as the threshold voltage, difficulties arise. More specifically, in such cases where two pits are formed so close to each other that the adjoining reproduced waveforms overlap each other at their foot portions, where the rise or fall of the wave is deviated from its right position due to a variation in the recording power, or where, when an optical recording medium on which pits are formed by heat applied thereto (a magneto-optic recording medium or an optical recording medium of the WORM (Write Once Read Many) type using recording material which produces a change in phase or deformation when subjected to heat) is used, the pit form is distorted by the effect of accumulated heat and, hence, the reproduced waveform is deformed, such an irregularity is not compensated for and the distortion in the reproduced waveform directly affects the edge position, and as a result, for example the detected edge positions come to deviate from the inverted positions in the original digital data or the inverted positions are dropped in the reading, and, hence, the data corresponding to the original digital data becomes unobtainable. Accordingly, when the edge detection method, in which the threshold voltage is established as described above, is used, there is a limit in the improvement of the pit density and, especially when the method is used for reproducing data from an magneto-optic recording medium or an optical recording medium of a WORM type, it becomes necessary to severely control the laser intensity or laser irradiating time at the time of recording.

SUMMARY OF THE INVENTION

The present invention has been made in view of the above mentioned difficulties in the conventional method. Accordingly, it is an object of the present invention to provide a method for signal detection on an optical recording medium whereby, even when a reproduced waveform is distorted as a result of distortion in a pit pattern on account of formation of pits too close to each other, variation in the recording power, or effect of accumulated heat, accurate edge positions in agreement with the inverted positions in the original digital data can be detected and a satisfactory reproduced signal is obtained.

In order to achieve the above mentioned object, a method for detecting signal on an optical recording medium by detecting edge positions of record pits formed on a signal recording layer using an established threshold voltage is characterized in that it comprises the steps of providing a tightest data position for forming a tightest pit pattern therein disposed in an area in the front of an effective data portion where an information pit pattern is formed, and establishing the threshold voltage according to the tightest pit pattern formed in the tightest data portion.

It is further characterized in that the threshold voltage is established by the average value of the maximum value and the minimum value of a reproduced waveform generated from the tightest pit pattern.

It is further characterized in that the pit-to-pit distance in the tightest pit pattern is smaller than the pit-to-pit distance in the information pit pattern.

It is further characterized in that the signal recording layer is formed of a recording layer of a magnetic material exhibiting a magneto-optic effect or a recording layer of a material producing deformation or a change in phase when subjected to heat.

A tightest data portion is provided in the area in front of an effective data portion and a tightest pit pattern is formed in the tightest data portion using the same recording power as that used for recording the information pit such that the pit-to-pit distance therein is smaller than the pit-to-pit distance in the information pit pattern and, the threshold voltage is established on the basis of the tightest pit pattern. Thereby, even when the reproduced waveform is distorted as a result of distortion in the pit pattern due to formation of pits too close to each other, variation in the recording power, or effect of accumulated heat, the distortion is compensated for and, thus, it becomes possible to obtain edge positions accurately in agreement with the inverted positions in the original digital data.

DESCRIPTION OF THE PREFERRED EMBODIMENTS

A particular embodiment of the present invention will be described below with reference to the accompanying drawings.

In the edge detection method, a reproduced waveform generated from information pits is superposed on a depiction of a preset threshold voltage so that intersections between the reproduced waveform and the threshold voltage are detected and, thereby, a set of digital data is reproduced taking the intersections as the data inverted positions.

In the edge detection method according to the present invention, in order to detect the edge positions accurately agreeing with the inverted positions in the original digital data, a tightest pit pattern having the pit-to-pit distance smaller than the pit-to-pit distance in the information pit pattern is formed on a recording medium using power at the same level as that used for forming information pattern. The threshold voltage is established on the basis of the reproduced waveform generated from the tightest pit pattern.

Embodiment

A particular example of the method for establishing the threshold voltage according to the tightest pit pattern will be described below with reference to FIG. 1(a)–FIG. 1(d)

In the following description, a magneto-optic recording medium will be used as the recording medium.

Figure 1A:
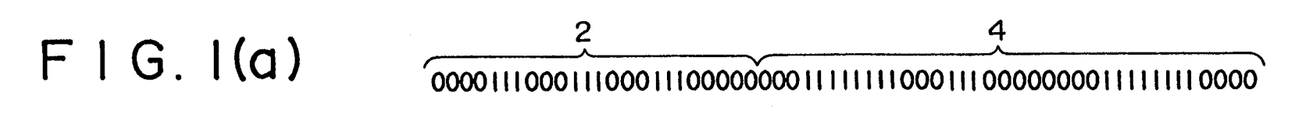
FIG. 1(a)–FIG. 1(d) is a schematic diagram explanatory of an example of signal detecting method to which the present invention is applied.

In FIG. 1(a), there is shown the tightest digital data 2 recorded in the tightest data portion. When the tightest digital data 2 is recorded in the tightest data portion, a tightest pit pattern 1 as shown in FIG. 1(b) is formed.

Figure 1B:
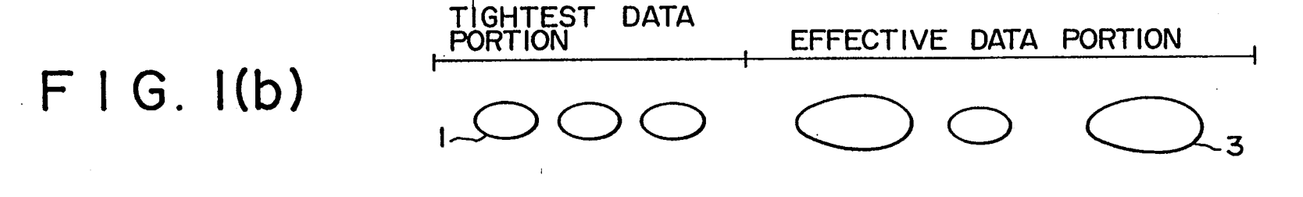

If original digital data 4 is recorded (digital data obtained by (2, 7) NRZI modulating an information signal is recorded as the original digital data) in the effective data portion, then an information pit pattern 3 as shown in FIG. 1(b) is formed. As apparent from FIG. 1(b), when a pit becomes long, it comes to have its rear portion widened by accumulated heat and assume a teardrop form.

Figure 1C:
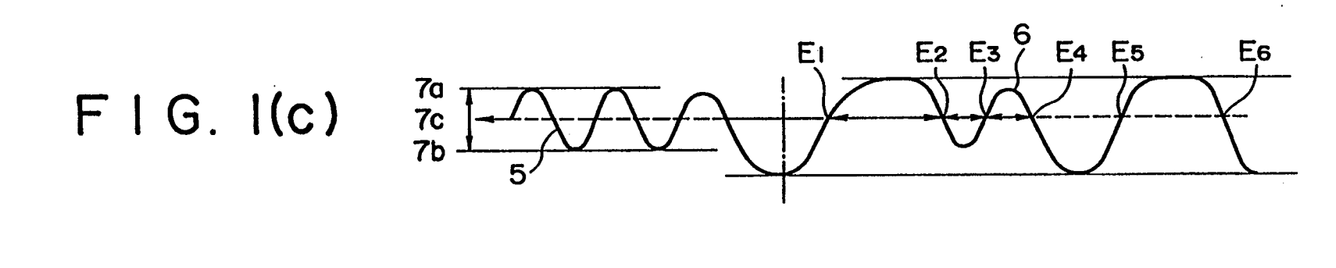

When such tightest pit pattern 1 and information pit pattern 3 are reproduced, a tightest waveform 5 and a reproduced waveform 6 as shown in FIG. 1(c) corresponding to the tightest pit pattern 1 and the information pit pattern 3 are generated, respectively. In the reproduced waveform 6 thus generated from the information pit pattern 3, there are observed distortions in the waveform corresponding to the distortions in the pits, i.e., where the adjoining pits are disposed close to each other, their waveforms overlap each other at their foot portions so that the waveform at this portion is not completely lowered to the bottom level.

The edge positions of the reproduced waveform 6 are detected to thereby discriminate the inverted positions of the data. To achieve this, the threshold voltage for detecting the edge positions of the reproduced waveform 6 is first established according to the tightest pit pattern 1. More specifically, the maximum value 7a and the minimum value 7b of the tightest waveform 5 reproduced from the tightest pit pattern 1 are detected and the average value $(7a+7b)/2$ of the maximum value 7a and the minimum value 7b is established as the threshold voltage 7c. If the threshold voltage thus obtained is superposed on the reproduced waveform 6, six edge positions $E_1$, $E_2$, $E_3$, $E_4$, $E_5$, and $E_6$ are detected.

When the edge positions $E_1$, $E_2$, $E_3$, $E_4$, $E_5$, and $E_6$ are compared with the original digital data 4, all the edge positions are in agreement with the inverted positions in the original digital data. Further, any inverted position is not dropped in the reading but all of them are correspondent to the detected edge positions.

Figure 1D:
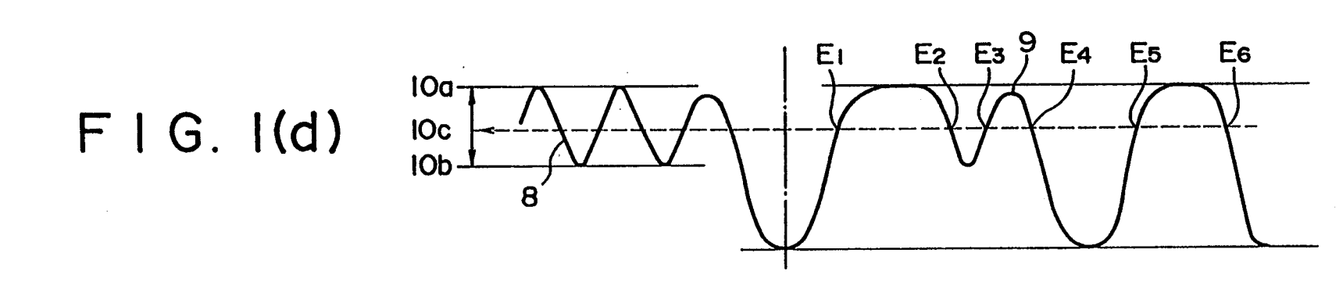

When similar tightest digital data 2 and original digital data 4 are recorded with higher recording power than that used in the above case and then the record is reproduced, a tightest waveform 8 and a reproduced waveform 9 as shown in FIG. 1(d) are generated.

If the maximum value 10a and the minimum value 10b of the tightest waveform 8 are detected, the average value of the maximum value 10a and the minimum value 10b, $(10a+10b)/2$, is established as a threshold voltage 10c, and the threshold voltage 10c is superposed on the reproduced waveform 9, six edge positions $E_1$, $E_2$, $E_3$, $E_4$, $E_5$, and $E_6$ the same as above can be detected.

As described above, if the threshold voltage is established according to the tightest pit pattern, edge positions accurately in agreement with the inverted positions in the original digital data can be obtained no matter whether low recording power or high recording power is used.

Figure 2:
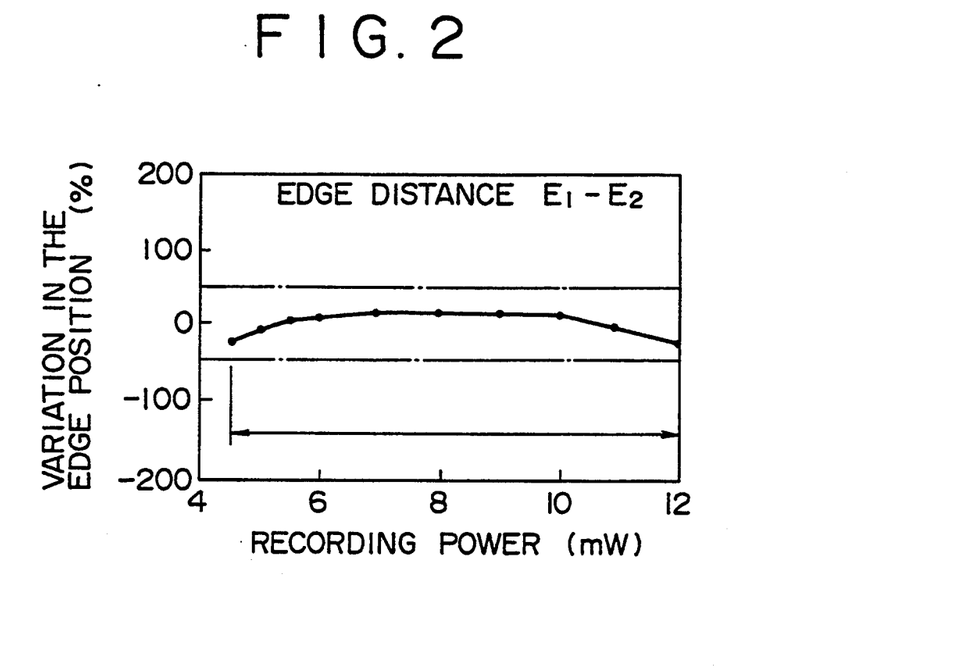
FIG. 2 is a characteristic diagram showing the variation in the distance $E_1$–$E_2$ depending on the recording power in the above signal detecting method.
Figure 3:
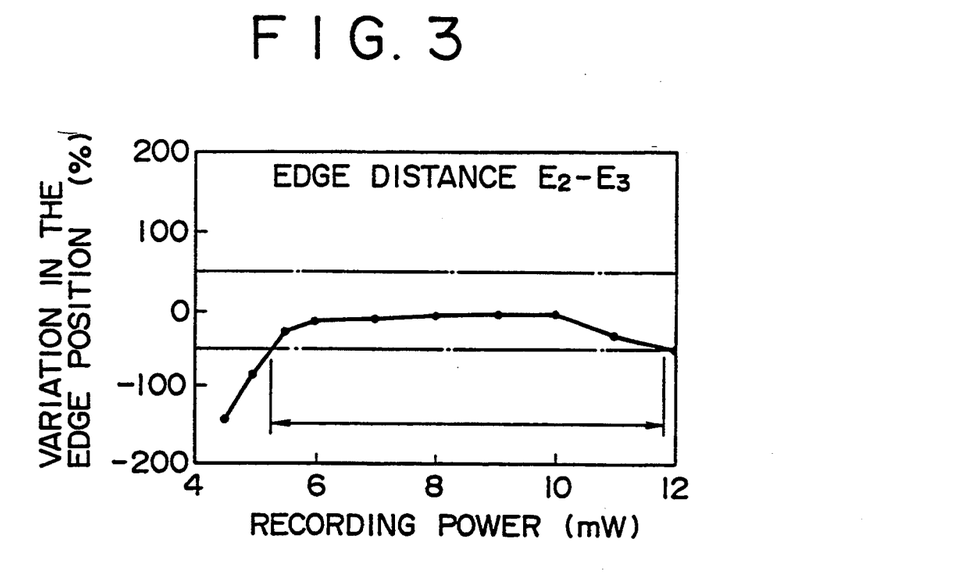
FIG. 3 is a characteristic diagram showing the variation in the distance $E_2$–$E_3$ depending on the recording power in the above signal detecting method.
Figure 4:
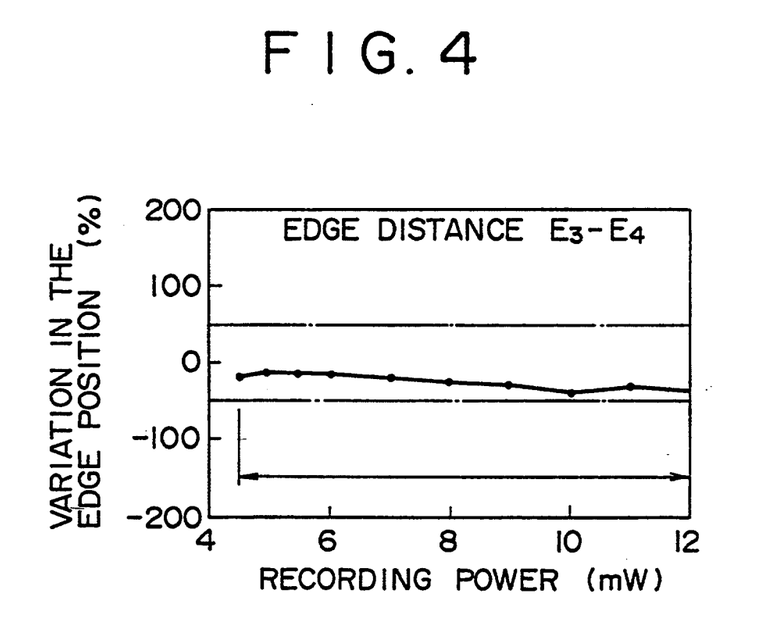
FIG. 4 is a characteristic diagram showing the variation in the distance $E_3$–$E_4$ depending on the recording power in the above signal detecting method.

When variations in the edge positions depending on the recording power are investigated, characteristics as shown in FIG. 2 to FIG. 4 are obtained.

The variation in the edge position is expressed by the difference between the distance of inversion in the original digital data and the detected edge distance ($E_1$–$E_2$, $E_2$–$E_3$, $E_3$–$E_4$) in percentage of one channel clock. FIG. 2, FIG. 3, and FIG. 4 correspond to the distance $E_1$–$E_2$, distance $E_2$–$E_3$, and distance $E_3$–$E_4$, respectively.

The range bounded by the upper and lower chain lines in each diagram shows the tolerance for the edge positions to be processed as those in agreement with the inverted positions in the original digital data.

As apparent from FIG. 2 to FIG. 4, the variation depending on the recording power is small for each of the edge positions and, further, the range of the recording power allowing all of the edge positions to be within the tolerance is as wide as from 5.3 to 11.8 mW.

From the above fact, it is assured that the establishment of the threshold voltage according to the tightest pit pattern is effective in preventing occurrence of reading error of the inverted positions due to variations in the recording power and in obtaining an excellent reproduced signal.

Comparison Example

Now, for comparison, a case where the average value of the maximum value and the minimum value of the reproduced waveform generated from an information pit pattern is established as the threshold voltage will be described with reference to FIG. 5(a)–FIG. 5(d).

Figures 5A, 5B, 5C:
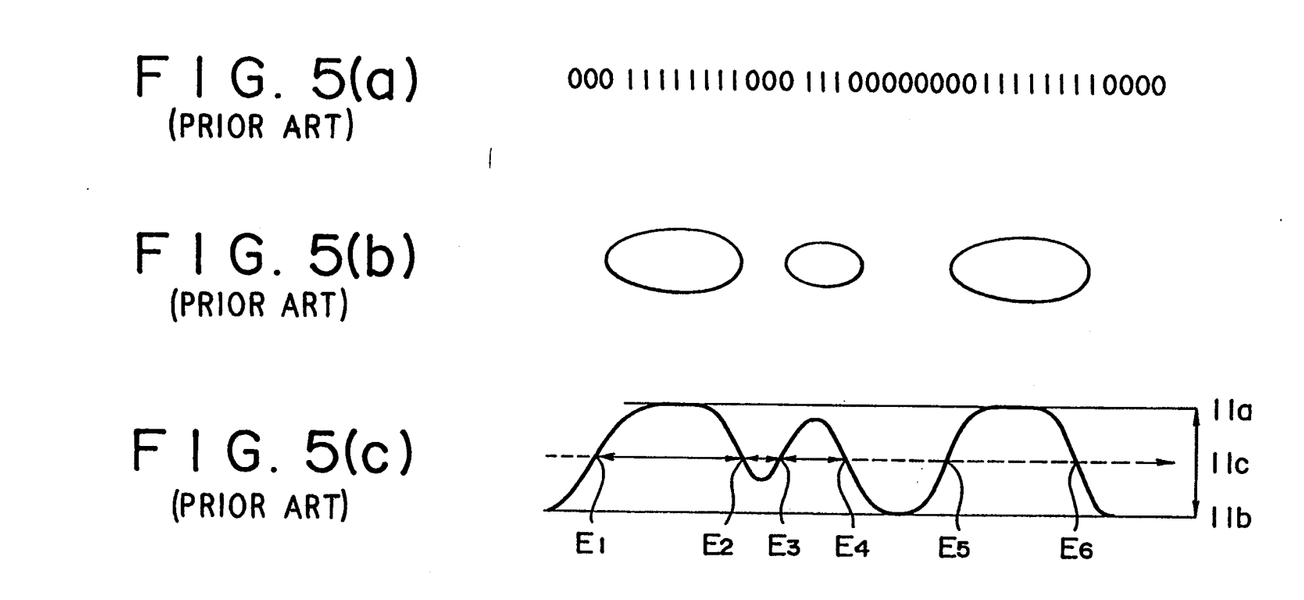
FIG. 5(a)-5(d) is a schematic diagram explanatory of a conventional signal detecting method.

Original digital data shown in FIG. 5(a) the same as that in the above embodiment is recorded in the information data portion so that an information pit pattern as shown in FIG. 5(b) is formed. When the information pit pattern thus formed is reproduced, a reproduced waveform as shown in FIG. 5(c) is generated.

Detecting the maximum value $11a$ and the minimum value $11b$ of the reproduced waveform, the average value of the maximum value $11a$ and the minimum value $11b$, $(11a+11b)/2$, is established as the threshold voltage $11c$. When the threshold voltage $11c$ thus established is superposed on the reproduced waveform, six edge positions $E_1$, $E_2$, $E_3$, $E_4$, $E_5$, and $E_6$ are detected.

Figure 5D:
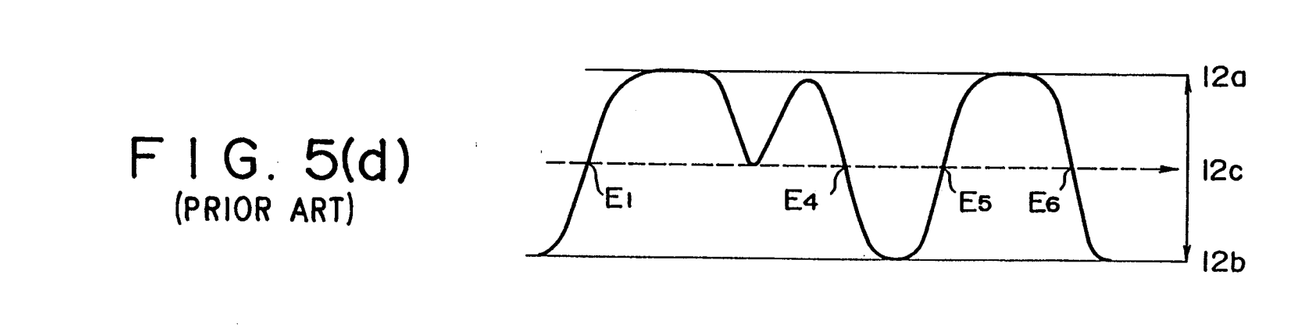

When the same original digital data is recorded with higher recording power than in the above case, a reproduced waveform as shown in FIG. 5(d) is generated.

Detecting the maximum value $12a$ and the minimum value $12b$ of the reproduced waveform, the average value of the maximum voltage $12a$ and the minimum value $12b$, $(11a+11b)/2$, is established as the threshold value $12c$. When the threshold voltage $12c$ thus established is superposed on the reproduced waveform, only four edge positions $E_1$, $E_4$, $E_5$, and $E_6$ can be obtained and two edge positions $E_2$ and $E_3$ are dropped in the reading. Further, when the detected edge positions $E_1$, $E_4$, $E_5$, and $E_6$ are compared with the original digital data, it is known that they are greatly different from the inverted positions in the original digital data.

When the average value of the maximum value and the minimum value of the reproduced waveform is established as the threshold voltage as described above, distortions in the reproduced waveform, especially when the recording power is high, greatly affects the edge positions and makes it impossible to obtain correct digital data.

Figure 6:
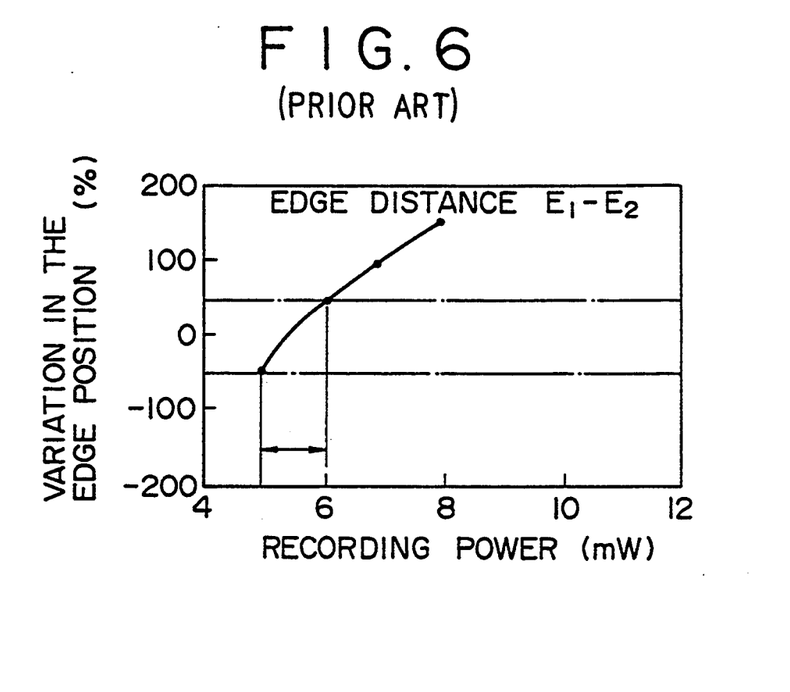
FIG. 6 is a characteristic diagram showing the variation in the distance $E_1$–$E_2$ depending on the recording power in the conventional signal detecting method.
Figure 7:
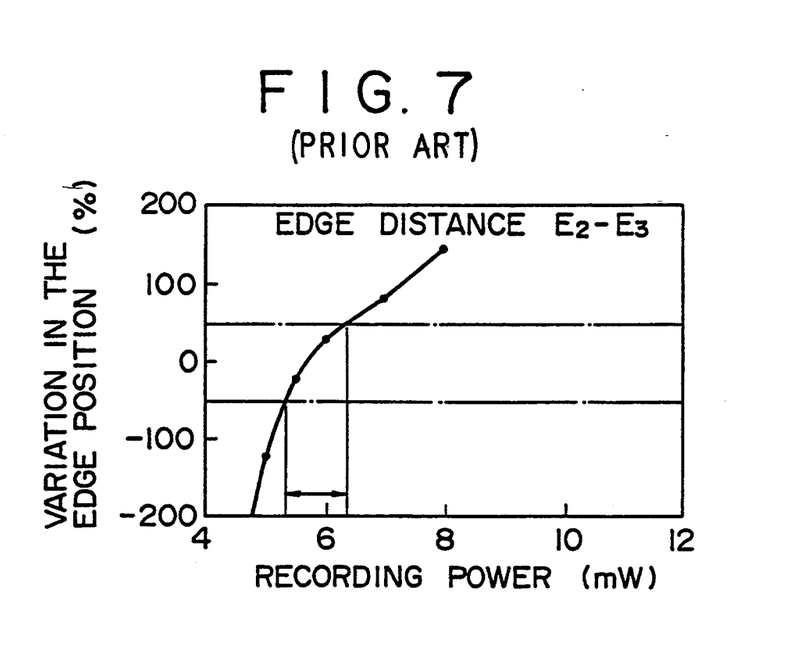
FIG. 7 is a characteristic diagram showing the variation in the distance $E_2$–$E_3$ depending on the recording power in the conventional signal detecting method.
Figure 8:
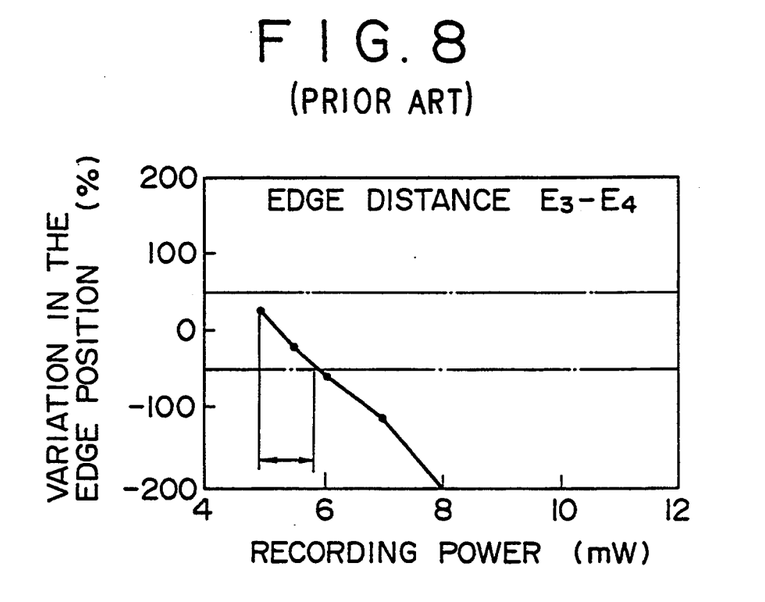
FIG. 8 is a characteristic diagram showing the variation in the distance $E_3$–$E_4$ depending on the recording power in the conventional signal detecting method.

When variations in the edge positions depending on the recording power are investigated, characteristics as shown in FIG. 6 to FIG. 8 are obtained. FIG. 6, FIG. 7, and FIG. 8 correspond to the distance $E_1$–$E_2$, distance $E_2$–$E_3$, and distance $E_3$–$E_4$, respectively.

As apparent from FIG. 6 to FIG. 8, the variation depending on the recording power is great for each of the edge positions and the range of the recording power allowing all of the edge positions to be within the tolerance is as narrow as from 5.3 to 5.8 mW.

From the above fact, it is known that the establishment of the threshold voltage according to the information pit pattern is not suitable for detection of edge positions accurately in agreement with the inverted positions.

As apparent from the foregoing description, by providing a tightest data portion for forming a tightest pit pattern therein disposed in the area in front of an effective data portion in which an information pit pattern is formed and establishing the threshold voltage on the basis of the tightest pit pattern formed in the tightest data portion, any distortions made in the reproduced waveform due to small pit-to-pit distance, variation in the recording power, and effect of accumulated heat, can be compensated for and digital data accurately in agreement with the original digital data can be reproduced.

Therefore, according to the present invention, recording with higher density on an optical recording medium is made achievable and, further, the need for severe control of laser intensity and the laser irradiating time in the recording can be eliminated and practicability of optical recording media can be improved.

What is claimed is:

1. A method for detecting a recorded information signal to be reproduced on an optical recording medium by detecting edge positions of recorded pits formed on a signal recording layer by producing a voltage waveform from a laser device scanning over the pits, and using an established threshold voltage and determining intersections between the threshold voltage waveform to locate edge positions of the pits corresponding to inverted positions of data, comprising the steps of:

providing a first data position for forming a first pit pattern of a plurality of closely spaced pits therein disposed in an area in the front of an effective data portion where an information pit pattern is formed;

scanning said first pit pattern and establishing a first voltage waveform thereof;

establishing a threshold voltage according to the first pit pattern formed in said first data portion of a magnitude dependent on the first voltage waveform of said first pit pattern;

scanning said effective data portion and establishing a second voltage waveform thereof; and determining intersection points of said threshold voltage and said second waveform to locate edges of pits in said information pit pattern.

2. A method for detecting signal on an optical recording medium according to claim 1, wherein said signal recording layer is formed of a recording layer of a magnetic material exhibiting a magneto-optic effect or a recording layer of a material producing deformation or a change in phase when subjected to heat.

3. A method for detecting a recorded information signal to be reproduced on an optical recording medium by detecting edge positions of recorded pits formed on a signal recording layer by producing a voltage waveform from a laser device scanning over the pits, and using an established threshold voltage and determining intersections between the threshold voltage waveform to locate edge positions of the pits corresponding to inverted positions of data, comprising the steps of:

providing a first data position for forming a first pit pattern of a plurality of closely spaced pits therein disposed in an area in the front of an effective data portion where an information pit pattern is formed;

scanning said first pit pattern and establishing a first voltage waveform thereof;

establishing a threshold voltage according to the first pit pattern formed in said first data portion of a magnitude dependent on the first voltage waveform of said first pit pattern;

scanning said effective data portion and establishing a second voltage waveform thereof; and determining intersection points of said threshold voltage and said second waveform to locate edges of pits in said information pit pattern;

wherein the pit-to-pit distance in the first pit pattern is smaller than the pit-to-pit distance in the information pit pattern.

4. A method for detecting signal on an optical recording medium according to claim 3, wherein said signal recording layer is formed of a recording layer of a magnetic material exhibiting a magneto-optic effect or a recording layer of a material producing deformation or a change in phase when subjected to heat.

5. A method according to claim 3, wherein the threshold voltage is established by an average value of a maximum value and a minimum value of said first voltage waveform generated from the first pit pattern.

6. A method for detecting signal on an optical recording medium according to claim 5, wherein said signal recording layer is formed of a recording layer of a magnetic material exhibiting a magneto-optic effect or a recording layer of a material producing deformation or a change in phase when subjected to heat.

7. A method for detecting a recorded information signal to be reproduced on an optical recording medium by detecting edge positions of recorded pits formed on a signal recording layer by producing a voltage waveform from a laser device scanning over the pits, and using an established threshold voltage and determining intersections between the threshold voltage waveform to locate edge positions of the pits corresponding to inverted positions of data, comprising the steps of:

providing a first data position for forming a first pit pattern of a plurality of closely spaced pits therein disposed in an area in the front of an effective data portion where an information pit pattern is formed;

scanning said first pit pattern and establishing a first voltage waveform thereof;

establishing a threshold voltage according to the first pit pattern formed in said first data portion of a magnitude dependent on the first voltage waveform of said first pit pattern;

scanning said effective data portion and establishing a second voltage waveform thereof; and determining intersection points of said threshold voltage and said second waveform to locate edges of pits in said information pit pattern;

wherein the threshold voltage is established by an average value of a maximum value and a minimum value of said first voltage waveform generated from the first pit pattern.

8. A method for detecting signal on an optical recording medium according to claim 7, wherein said signal recording layer is formed of a recording layer of a magnetic material exhibiting a magneto-optic effect or a recording layer of a material producing deformation or a change in phase when subjected to heat.

* * * * *